Oct. 27, 1970 H. H. ADELAAR ET AL 3,536,847

CROSSPOINT OPERATING CIRCUIT

Filed Jan. 18, 1968

Inventor
H. H. Adelaar – F. C. L. De Wit

By [signature]
Attorney

United States Patent Office 3,536,847
Patented Oct. 27, 1970

3,536,847
CROSSPOINT OPERATING CIRCUIT

Hans Helmut Adelaar, Kapellenbos, and Frans Corneel Leo De Wit, Mortsel, Belgium, assignors to International Standard Electric Corporation, New York, N.Y., a corporation of Delaware Filed Jan. 18, 1968, Ser. No. 698,766
Claims priority, application Netherlands, Aug. 16, 1968, 6701052
Int. Cl. H04q 3/42
U.S. Cl. 179—18 18 Claims

ABSTRACT OF THE DISCLOSURE

The serial marking technique (1) using a reed crosspoint (2) is improved by the invention in that the marking potential at the beginning of the connection is applied through a constant current device. This means that the same operating current is used in any stage and this controlled current is also useful to avoid too much current in a cut-off relay leading to a return to the released condition. The main aspect of the invention is, however, directed to a pseudo-one-shot operation of the series crosspoints by marking their diodes simultaneously through capacitors. By grounding the capacitor through the low output impedance of an operational amplifier its high impedance input connected to the marking diode end of the capacitor can maintain a virtual ground until the crosspoint has closed its contact, ensuring currentless contact closure.

CROSSPOINT OPERATING CIRCUIT

Figure 1:
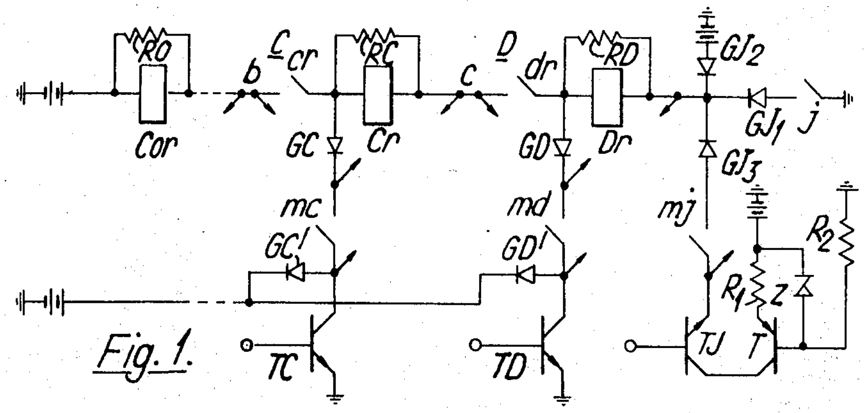

The invention relates to a crosspoint operating circuit including an operating path, a holding path, means to complete said operating path and means for thereafter completing said holding path and for disabling said operating path.

A circuit of this type using a crosspoint arrangement as disclosed in the Belgian Pat. No. 570,716 (H. Stobbe et al. 17–7–7) has been described for instance in the German patent application No. St 24,655, filed on Nov. 17, 1965 (H. Schlüter 10). The crosspoint arrangement of the Belgian Pat. No. 570,716 comprises the winding of a relay, a marking diode and a make contact of the relay, these three elements having a common terminal. By applying a suitable marking potential source to the winding of the relay in series with the diode, the relay operates and may thus transfer a marking potential through its make contact to the following switching stage in order to operate another relay in that stage whose marking diode is also marked connected to an adequate potential. If the marking potentials applied to the diode have the same value for all the switching stages, before a relay in a given stage can be operated, it is evident that the marking potential applied to the diode in the preceding switching stage must be disconnected so as to remove the short circuit on the relay which then operates in series with the relay already energized in the previous stage.

One may however avoid this sequential withdrawal of the marking potentials in the successive switching stages provided different marking potentials are used in each stage, the potential difference corresponding to the operating voltage for a relay.

In the German patent application No. St 24,655, it is shown that by a suitable choice of the circuit characteristics, one may ensure that as soon as a crosspoint relay operates in the next switching stage, the previously conducting diode in the stage considered is immediately subjected to a blocking potential so that all available current is from then on steered towards the succeeding switching stages.

While such a system does not necessitate sequential operating means to withdraw the marking potentials, it has advantages from the point of view of speed of operation. Also, while the use of different marking potentials in the various switching stages means that if a connection is interrupted due to contact chatter during the marking and operating phase, this will only be momentary, since a potential difference is immediately available to re-operate the relays included in the chain. The arrangement implies that the make contact is closed between two points at different potentials so that there will be a switching of current. Particularly when such crosspoint arrangements are realized by means of reed relays, it is however generally desirable in order to ensure a long relay life to avoid that their contacts would switch current.

In accordance with a first aspect of the invention, a first object thereof is to avoid the use of separate sequential operating means and to ensure currentless switching of the crosspoint contacts while at the same time providing for a prompt blocking of the marking diode used initially to pass operating current through the crosspoint relay.

In accordance with a first characteristic of the invention, a crosspoint operating circuit of the type initially defined is characterized in that said operating path includes a timing circuit automatically causing the path to be disabled after having been operated.

In accordance with another characteristic of the invention, said disabling action is put into effect by the establishment of said holding path.

In accordance with a further characteristic of the invention, said operating path includes a relay winding in series with an asymmetrically conducting element and with a capacitance whereby the operation of said relay closes a make contact thereof coupled to said element thereby closing said holding circuit and immediately placing said element in a high impedance condition to interrupt said operating path.

Thus, the actuating current flows through the crosspoint relay winding in series with the crosspoint marking diode and also through a series capacitor which may be provided in common for the whole of the marking leads controlling a given switching stage. The value of the capacitor should be chosen so that the crosspoint relay has time to operate before too large a voltage builds up across the capacitor. In this manner, when the crosspoint relay operates and closes its make contact, one may have across the capacitor a voltage just adequate to ensure the blocking of the marking diode which will occur instantaneously as soon as the make contact closes since this will bring there at the common potential, e.g. ground, to which the capacitors in the various stages are connected. Accordingly, the voltage which is present across the make contact when it closes is no longer that necessary to operate a relay and in fact no longer equal to the holding voltage across the relay plus the desired blocking voltage across the marking diode as disclosed in the German patent application No. St 24,655 mentioned above, but it has merely to be equal to the desired blocking voltage across the marking diode. Moreover, this blocking of the diode is no longer dependent on transient conditions having subsided and on a crosspoint relay in the next stage having been operated since it is now practically instantaneous, occurring as soon as the make contact closes towards the next switching stage.

A further object of this aspect of the invention is to completely avoid switching of current when closing a crosspoint contact.

In accordance with a further characteristic of the invention, the crosspoint operating circuit is characterized in that the end of the capacitance away from the asymmetrically conducting element is coupled to a variable potential source. From the moment operating current starts to flow through, said capacitance assumes a charatceristic such as to keep substantially zero potential across the serial combination of said capacitance and said variable voltage source. This condition is maintained for a predetermined time duration at least equal to the time of operation of said relay. Thereafter, said variable voltage source assumes such a potential that the voltage across said serial combination becomes sufficient to create a blocking potential across said asymmetrically conducting element.

Thus, in the above manner, one may not only avoid a special sequential circuit in order to successively withdraw the marking potentials of common value applied at the successive switching stages, but at the same time one also avoids that the crosspoint relay contacts have to switch any curent since they are not subjected to any potential difference at the time they are operated. The variable potential source which is inserted in series with the common capacitance may preferably be realized by using a high-input-impedance/low-input-impedance operational amplifier with a bootstrap characteristic having its live input terminal connected to that end of the capacitance coupled towards the marking diode and having its live output terminal connected to the other end of the capacitance, a common input/output terminal of the amplifier being connected to a point of fixed potential.

In a crosspoint operating circuit of the general type described, and as shown for instance in the above mentioned German patent application No. St 24,655, a suitably high positive marking potential may be applied at one selected end of the network so that with, say ground temporarily applied to selected marking diodes in the first switching stage next to that positive potential marking source, a crosspoint relay, corresponding to the selected end and to the selected marking lead, will be operated. Subsequently, in an analogous manner, this positive marking potential will cause curent to flow through crosspoint relays in the following stages which will gradually be connected in series and will finally be held operated, first independently of the ground marking potentials and then independently of the positive marking potential applied at one end of the network. Such a switching network, with a unique path between any pair of terminals, one at each end of the network, may be used in telephony, for instance to interconnect a plurality of junctor circuits to which the positive marking potential is applied and a larger plurality of line circuits, and more particularly the cut-off relays thereof having one terminal connected to negative battery. In this way, if such a serial connection uses the test wire of a telephone connection the latter may be established and held operated from the junctor circuit, the crosspoint relays being provided in addition to the make contact serving to operate and hold the connection, with two additional make contacts which establish the desired speech connection.

A telephone cut-off relay must generally be provided with at least two break contacts in order that test conductors normally coupled to the speech wires may be disconnected therefrom when a talking connection is to be established. In a switching exchange using reed contacts for the crosspoint relays it may also be desirable to use reed relays for the cut-off function. In such a case, permanent magnetization must be provided for the cut-off reed relay in order that some of its contacts might normally be closed whereby a suitable magnetic flux generated by the winding of this cut-off relay could then counteract the effect of the permanent magnetic bias and thereby open the contact when desired. However, with a normal design an over-excitation by the flux produced by the relay winding might again keep the contacts closed. Thus it is important that the current through such a cut-off relay should not exceed prescribed limits if it is to operate in a correct manner.

In this respect, problems may be encountered. After operating all the crosspoint relays between say a positive marking potential at the starting end and marking ground for the diodes (cathodes), a holding circuit for all the crosspoint relays in series between this positive potential and ground must finally lead to a final holding circuit independent from the marking potentials which must be disconnected. Moreover, the potentials along the final holding connection must become such that newly applied ground marking potentials cannot render again conductive those diodes pertaining to crosspoints involved in a final holding connection. As disclosed in the above mentioned patent such undesired interferences are prevented by using a negative end-of-chain holding potential, i.e. by biasing the cut-off relay to this negative potential. After the cut-off relay operates in series with the crosspoint relays when the last thereof closes its make contact, one may then replace the positive marking potential at the starting end by say a ground potential. All potentials along the final holding connection are thus negative and the diodes connected thereto with their anodes cannot be made conductive again. In this process however a shift of potential is first made at the terminating end before a corresponding shift takes place at the starting end and this may temporarily send a larger current through the relays and particularly the cut-off relay.

Correct operation of such a reed cut-off relay may also be difficult to achieve in a switching network where it may be desirable at certain times to establish a path through the network towards a cut-off relay which is already involved in a holding connection towards a junctor at the other end of the network. In such a case and assuming that ground is ultimately provided in the junctor circuit to hold the connection towards negative battery at the cut-off relay, whereas a positive battery potential is used when initially marking a new connection, it is clear that this positive marking potential will be responsible for a substantially increased current through the cut-off relay already involved in a holding connection and thereby the operated condition of this relay might be endangered.

Also, the sequential operation of the crosspoint relays in the successive stages with the relays held in series with the previously operated relays means that the first relay in the chain will receive a higher operating current than the next, etc. so that the operating currents will be different for the relays depending on the switching stage considered.

Another difficulty which may arise in such networks is that if a contact sticks due to some faults, undesired double connections might arise. This could be the case for instance if, in the first switching stage connected on the side of the positive marking potential, due to a fault there are two marking wires leading to the marking diodes to which ground is applied. In such a case, current will flow through two crosspoints and two chains of crosspoints might be operated thereby creating a double connection.

In accordance with a second main aspect of the invention, means are provided to avoid the above drawbacks and in such a way that this can be combined with a currentless operation of the crosspoint relay contacts.

In accordance with this aspect of the invention, a crosspoint operating circuit of the type initially defined is characterized in that current regulating means are included in said operating and holding paths.

Thus, a positive marking potential source may now be applied at one end of the network to start the operation of a chain of crosspoints through a common current regulating device or constant current source which will automatically ensure that whatever the switching stage concerned, the crosspoint relay will receive the same predetermined amount of current. In such a case, it is clear that one may design the crosspoint relays so that if due to some fault this marking and operating current is divided into more than one path, the current which will not be greater than half the nominal one will be insufficient to cause the operation of the crosspoint relays and create double connections. Moreover, close control of the operating current will be particularly useful in relation to the cut-off relays if they are of the permanent magnet biased reed type since when double connections are temporarily established on purpose towards an operated cut-off relay, one may ensure that the additional marking current will not lead to a return of the cut-off relay contacts to their normal condition.

Also, while the operating circuits for the crosspoint relays are established between a positive marking potential and ground, the desirability of finally holding the established connection between ground and negative battery has been explained. This will ensure that the marking diodes connected to an established connection will remain blocked when new ground marking potentials are applied to the network to establish new connections. This means that in the last switching stage next to the cut-off relays in the telephone line circuits, if the arrangement in accordance with the first aspect of the invention is used whereby a marking diode is immediately blocked as soon as the make contact of the relay is closed, the current regulating source will maintain control and avoid that the cut-off relay would, by receiving too much current through its winding, fail to reach the correct operated condition. Thus, the use of a current source in conjunction with the immediate blocking of the marking diodes as soon as the make contact closes means that one can combine the advantage of a constant operating current for the crosspoint relays with currentless switching by the relay contacts, which could not be achieved otherwise. Equal operating current could be secured by inserting resistances of gradually decreasing value in series with the marking diodes as one moves away from the first stage next to the positive marking potential, so as to equalize the operating current initially sent through the relays of the various stages. But this would automatically create potential differences which would be applied to the relay make contacts as they are closed towards the next switching stage.

Figure 2:
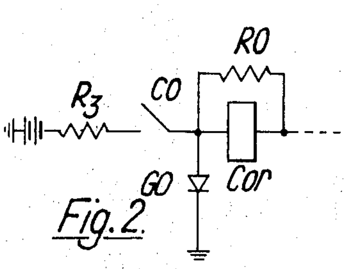
Figure 3:
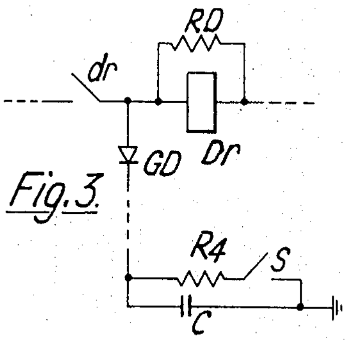
Figure 4:
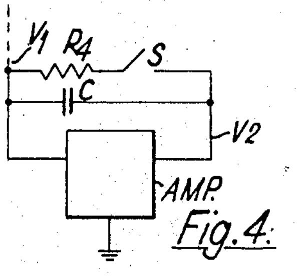
Figure 5:
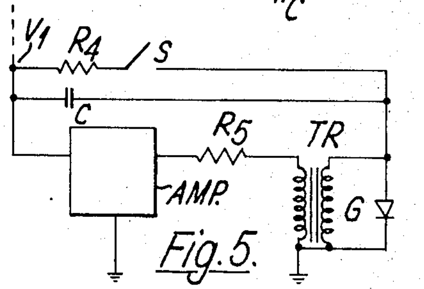
Figure 6:
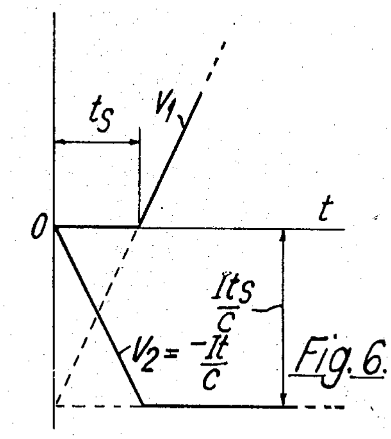

The above and other objects and characteristics of the invention as well as the best manner of attaining them and the invention itself will be better understood from the following detailed description of embodiments thereof to be read in conjunction with the accompanying drawings which represent:

FIG. 1, a switching network showing the application of the current regulating means of the invention and to which the marking diode blocking means of the invention may also be applied;

FIG. 2, a modification of the operation circuit for the telephone cut-off relay part of the circuit of FIG. 1;

FIG. 3, a modification of the marking circuit used in FIG. 1 and in accordance with the invention;

FIG. 4, a modification of the marking circuit in accordance with the invention and represented on FIG. 3;

FIG. 5, a further modification of the marking circuit in accordance with the invention and represented on FIGS. 3 and 4;

FIG. 6, voltage characteristics of the circuit shown on FIG. 4; and

Figure 7:
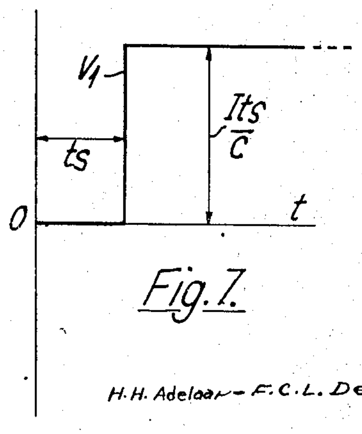

FIG. 7, a voltage characteristic for the circuit shown on FIG. 6.

Referring to FIG. 1, the latter represents schematically a crosspoint network operating circuit to be used in a telephone exchange, whereby, starting from a desired junctor circuit, a series of crosspoint relays such as D*r*, C*r*, etc. may be operated serially in successive switching stages and finally in series with the cut-off relay Co*r* of a desired telephone line circuit. One may assume that there are two further crosspoint relays serially connected in this manner between cut-off relay Co*r* and crosspoint relay C*r* but these have not been represented. The last crosspoint relay D*r* shown is in the final and fourth switching stage leading to telephone junctor circuits.

If it is desired to establish a connection between a particular junctor circuit and a particular line circuit, positive battery will be applied as a marking potential to a conductor in the desired junctor circuit. In order to select the latter, a particular marking relay contact *mj* will be closed and this will establish a connection between the emitter of an NPN transistor TJ and a conductor in the desired junctor circuit, e.g. through diode $GJ_3$ poled as shown and which may prevent high transient voltages from reaching TJ and/or decouple two or more conductors in the same junctor circuit, for instance the junctor input and output, characterized by the particular contact *mj*. This junctor circuit conductor is multiplied to several crosspoints in the switching stage having direct access to the junctors so that it is necessary to select a desired crosspoint among those to which the junctor circuit has access. This will be done by closure of a particular marking relay contact *md* which will couple the collector electrode of an NPN transistor TD to a plurality of marking diodes such as GD one of which is part of the desired crosspoint which also includes the relay winding D*r* and the make contact *dr* of that relay, these three elements having a common point. Additionally, a resistance RD is connected in shunt across the relay winding in order to protect the crosspoint coils against high voltage transient spikes. Moreover, such a resistance as RD across the winding of relay D*r* permits to avoid as much as possible arcing on the crosspoint contacts in order to prevent interferences on the one hand and to increase the contact life time on the other.

When such a selection of the operating path for the desired crosspoint relay D*r* has been accomplished by the closure of a selected pair of marking relay contacts *mj* and *md*, a suitable positive pulse may be applied to the base of transistor TJ and also a similar pulse to the base of transistor TD, both pulses having the effect to render these transistors conductive. Indeed, at that moment, the positive battery potential which, through resistor $R_1$, is applied to the emitter of transistor T having its base connected to ground through resistor $R_2$, may cause collector current to flow in that PNP transistor and in the NPN transistor TJ whose collector is coupled to that of T. From the emitter of TJ the current flows through marking contact *mj*, diode $GJ_3$, relay winding D*r*, marking diode GD, marking contact *md* and the collector-emitter space of transistor TD to ground. A Zener diode is coupled as shown between positive battery and the base of transistor T so that under steady conditions the current which will be allowed to flow through that series circuit is substantially equal to the Zener voltage divided by the resistance $R_1$. In this manner, a substantially constant current will flow to operate the first crosspoint relay D*r*.

The desired crosspoints in the following stages, such as relay C*r*, may be selected in the same manner, e.g. due to the operation of a marking relay make contact such as *mc* and by rendering conductive such a transistor as TC which is used in multiple for the crosspoints of the C stage in the same way as transistor TD is used in common for those of the D stage. By rendering such transistors as TC conductive after the marking relay contact such as *mc* has been closed, one avoids that such contacts switch current. As soon as TC is conductive, a holding circuit is thus ready for relay D*r* when it closes its make contact *dr*. As soon as this has occurred, the pulse at the base of transistor TD may disappear to block this transistor and at that moment the current controlled by the arrangement involving transistor T is diverted from the marking diode GD and flows through relay C*r* towards ground at the emitter of transistor TC. In this manner, currentless switching of the crosspoint contacts such as *dr* can be achieved and moreover every crosspoint relay irrespective of the switching stage in which it is located will be operated by the same constant current controlled by the Zener diode Z.

The connection will proceed stage by stage in the manner explained until current is allowed to flow through the desired cut-off relay *Cor* one end of which is connected to negative battery and which relay has its winding shunted by a resistor RO analogous to resistors RC and RD. Relay *Cor* also operates and after all the marking transistors such as TD and TC have been cut off, contact *j* may be closed in the selected junctor circuit to apply ground to relay D*r* through decoupling diode $GJ_1$. This prevents short-circuiting of the transistors T and TJ between positive battery and ground but as soon as this junctor circuit contact *j* is closed, the positive pulse at the base TJ which is long enough to encompass the positive pulses applied to the other transistors such as TD can also subside causing the blocking of transistors TJ and T and accordingly, the final holding of the connection involving the relays *Cor*, . . . C*r* and D*r* through the closed make contact *j*. The marking contacts such as *mc* and *md* may then be opened without breaking a current path and this is also true for marking contact *mj*. As none of the potentials of the holding connection are higher than ground (junctor, c-link between the C and D stages, b-link, etc.), further marking operations can be performed without interference with the established connections since these new marking operations can only apply ground potential to the cathodes of such diodes as GC and GD whose anodes are at a negative potential and accordingly these will remain blocked to isolate the established connections.

The function of diode $GJ_2$ whose anode is connected to negative battery in the junctor circuit and whose cathode is multiplied to a set of D*r* relays is to provide a short-circuiting path when make contact *j* is re-opened at the end of a connection. Indeed at that moment the relays will release but this short-circuiting path through the low resistance afforded by the conductive diode $GJ_2$ will enable the holding current to decay exponentially during the time necessary for the first relay in the chain to release thereby opening its make contact such as *cr*. By that time, it can be arranged that the residual energy stored in the serially connected relays is very small and accordingly the opening of the first contact will not create problems.

The collectors of the marking transistors such as TC and TD are clamped through the diodes GC′ and GD′ respectively so as not to exceed positive battery potential. These are also useful in connection with the switching of the marking current from one stage to the next. At this moment, high voltage transient spikes may be generated and the clamping action will protect the marking transistors such as TC.

FIG. 2 shows a modification of the circuit of FIG. 1 wherein a relay *Cor* is now connected to ground at one end of its winding through a diode GO. In this manner, when the last crosspoint relay in the chain closes its make contact (not shown) the conditions will be exactly the same as for the crosspoint relays in the other stages. It is only the relays *Cor* shown in FIG. 2, and which are lesser in number than the crosspoint relays of the adjoining stage, which will have to pass current through their make contacts CO connected to the junction of their windings with the diodes GO, when they are closed towards the resistances $R_3$ whose other ends are connected to negative battery.

In connection with the relays in the last switching stage (not shown) towards the cut-off relays, it should be remarked that the number of operations will already be relatively smaller in comparison with the relays of the other switching stages since it is on the side of the telephone subscribers that the traffic is the smallest, it being concentrated on the side of the junctors. Thus, although a currentless switching operation can also be secured for the relays of that last switching stage when the arrangement of FIG. 2 is used, in general the reliability of a crosspoint relay in that stage next to the line circuit will in any event be satisfactory.

Should contact sticking occur, for example if two make contacts such as *md* are closed simultaneously when it is desired to operate only one relay D*r*, two such relays will find themselves in a parallel circuit. But as the arrangement involving transistor T supplies a substantially constant marking current, it is easy to design the relays so that in such circumstances none of the relays D*r* operate and the fault can be traced. This is particularly useful since otherwise, in this manner, a double chain of operated relays could be built up resulting in crossed connections.

As discussed in the opening part of this description, the constant current marking source offers also the advantage that if the cut-off relay *Cor* uses a reed arrangement biased by a permanent magnet, in some circumstances it will be easier to avoid too large a current through the cut-off relay, with the result that instead of opening its normally closed break contacts, these contacts would again be closed due to the large flux applied.

In the arrangement of FIG. 1, currentless switching of the crosspoint relay make contacts *dr* and *cr* is achieved by using a sequential arrangement (not shown) for removing the marking grounds supplied through the transistors such as TD and TC enabling the various crosspoint relays to energize successively one after the other.

FIG. 3 shows a modification of FIG. 1 enabling to dispense with such a sequential circuit. The modification represents only a part of FIG. 1 and particularly a part of the marking circuit for the D switching stage, since the rest of the circuit need not be modified. It should be understood however that the modification shown by FIG. 3 as applied to the D switching stage should likewise be carried out for all the remaining switching stages. FIG. 3 shows that the cathode of marking diode GD is coupled to ground when it is desired to operate the relay through the marking diode GD part of the crosspoint. This time the coupling (dotted line) extends not only through the selecting circuitry of FIG. 1, but also through a capacitor C which may be provided in common for all the crosspoints of the D switching stage. Accordingly instead of a DC circuit for the operating path, an AC circuit is now provided. Thus, when the selecting contact is closed, and assuming that positive marking potential has been applied as described before to the right-hand end of the winding of relay *D*r, a current will flow to ground through this relay, the marking diode GD and capacitor C, creating thereacross a gradually increasing voltage. By a suitable choice of the value of capacitor C it may be ensured that when make contact *dr* closes due to the energization of relay D*r*, the positive voltage at the left-hand terminal of capacitor C is just large enough to cause the blocking of the marking diode GD, closure of *dr* bringing ground potential to the anode of GD through the capacitor in the next C switching stage, assuming that therein a set of crosspoints has also been marked by the closure of such a contact as *mc*. This means that as soon as make contact *dr* closes, the constant current supplied by the arrangement involving transistor T will immediately be diverted from the marking diode GD into that closed contact to cause the operation of the next crosspoint relay C*r* in an analogous manner to that described. By way of example, with reed relay crosspoints having an inductance of about 230 millihenries with a series resistance of 180 ohms and with an external shunt resistor RD equal to 5 kilohms, experimental tests have demonstrated that a suitable value for the capacitors such as C could be of the order of 1 microfarad.

Thus, the process is completely automatic since as soon as a crosspoint relay has been operated in one stage and before anything happens in the next, the mere closure of the make contact of the crosspoint relay will result in the path through this crosspoint marking diode being interrupted. A resistor $R_4$ may be coupled in shunt across C by closing make contact S after the connection has been established so as to discharge the capacitor in preparation for a new marking operation. The potential secured across capacitor C at the time contact *dr* closes, in order to effectively block marking diode GD, implies nevertheless that some amount of current switching will have to be performed by the make contact.

FIG. 4 shows a modification of the circuit of FIG. 3 permitting to avoid this. As in the latter, there is still a capacitor C, but the right-hand side of capacitor C is now no longer directly connected to ground but to the output of an operational amplifier AMP which input is connected to the left-hand side of capacitor C, this amplifier having a common ground terminal. With a high input impedance and a low output impedance, a bootstrap action can be performed by amplifier AMP so that a virtual earth will be provided for the potential $V_1$ at the left-hand side of capacitor C as long as the amplifier is not saturated. In other words, the right-hand terminal of capacitor C is going negative as soon as current starts to flow through the marking circuit and this in order to clamp the left-hand terminal of capacitor C to ground. If I is the constant current supplied by the arrangement involving transistor T (FIG. 1), the voltage across the originally uncharged capacitor C will thus follow the law $It/C$ where $t$ is the time and if the output voltage $V_2$ of amplifier AMP provides the negative of that characteristic, then as long as such a condition persists, as indicated by the diagram of the voltages on FIG. 6, $V_1$ will initially remain at zero level. After a time $t_s$ which is that necessary to reach saturation of the amplifier AMP, the voltage $V_2$ will thus have reached $$\frac{-It_s}{C}$$

which is the potential difference across the capacitor and from that moment, $V_2$ remaining substantially fixed, $V_1$ will then start to increase linearly from zero level with a rate $I/C$.

Thus if $t_s$ is chosen at least equal to the crosspoint relay operating time, bounce included, one can ensure that the make contact will not have to switch current.

FIG. 5 represents a further modification of the circuit of FIG. 3 in order to have a steeper potential jump for $V_1$ at time $t_s$. As shown the output terminal of amplifier AMP is now coupled to the right hand terminal of capacitor C through a series resistor $R_5$ and a shunt transformer TR having its primary winding grounded at one end and in series with $R_5$ and its secondary winding also grounded at one end connected to the right hand terminal of capacitor C. A diode G poled as shown is coupled across this secondary winding of TR. This inclusion of a transformer in the feedback loop of the bootstrap amplification arrangement means that when the saturation point of the operational amplifier is reached at time $t_s$, the potential across the primary winding of the transformer no longer varies and no more current can be transferred to the transformer secondary winding. The magnetic field collapses and the constant current I is now switched through the diode G which clamps the right hand terminal of C to ground. Since by time $t_s$ capacitor C has asquired a potential across its terminals equal to $It_s/C$, as represented by FIG. 7 potential $V_1$ will suddenly jump at that moment by an amount corresponding to the voltage developed across the capacitor now having one terminal clamped to ground. If the transformer TR produces a phase reversal, it is clear that the amplifier AMP should now provide a voltage characteristic $V_2$ at its output terminal which is the negative of that shown in FIG. 6.

Another advantage of the capacitors C is that they provide a very convenient way to check that crosspoint operations are being performed satisfactorily and for instance, that a marking diode such as GD (FIG. 1) is not short circuited. First of all, one may detect the potential generated across capacitor C as an indication that the corresponding crosspoint relay has operated. Then, after establishment of a holding connection and before discharging the capacitor with the help of the switch contact *s*, one may check that substantially this positive voltage has remained across the capacitor, this indicating that the marking diode GD is not short-circuited.

Various modifications of the circuit arrangement described can of course be carried out. For example, in cases where the contacts have no appreciable bounce, time could eventually be saved by ensuring that each time a crosspoint contact closes, the amplifier of the previous switching stage is forcibly taken to its saturation point. This could be ensured by a feedback circuit from each stage to the previous one, for instance by means of a connection containing a snap action device such as a flip-flop or Schmitt trigger between the output of each amplifier and the input of the amplifier in the previous stage.

While the principles of the invention have been described above in connection with specific apparatus, it is to be clearly understood that this description is made only by way of example and not as a limitation on the scope of the invention.

We claim:

1. Crosspoint operating circuit including an operating path, a holding patch, means to complete said operating path and means for thereafter completing said holding path and for disabling said operating path, characterized in this, that said operating path includes a timing circuit automatically causing it to be disabled after having been operated, and means responsive to operation of said timing circuit for preventing current flow across relay contacts as the contacts open and close.

2. Crosspoint operating circuit as claimed in claim 1, characterized in this, that said operating path forms a monostable circuit.

3. Crosspoint operating circuit as claimed in claim 1, characterized in this, that said disabling action is put into effect by the establishment of said holding path.

4. Crosspoint operating circuit as claimed in claim 1, characterized in this, that said timing circuit is used in common for a plurality of operating circuits.

5. Crosspoint operating circuit as claimed in claim 1, characterized in this, that a regulated current source is supplied in series with a voltage source.

6. Crosspoint operating circuit including an operating path, a holding path, means to complete said operating path and means for thereafter completing said holding path and for disabling said operating path, characterized in this, that said operating path includes a timing circuit automatically causing it to be disabled after having been operated, and said operating path is an AC circuit.

7. Crosspoint operating circuit as claimed in claim 6, characterized in this, that said operating path includes a source of energy in series with a relay winding, with an asymmetrically conducting element and with a capacitance whereby the operation of said relay closes a make contact thereof coupled to said element thereby closing said holding circuit and placing said element in a high impedance condition to interrupt said operating path.

8. Crosspoint operating circuit as claimed in claim 7, characterized in this, that the end of the capacitance away from the asymmetrically conducting element is coupled to a variable potential source which from the moment operating current starts to flow through said capacitance assumes a characteristic such as to keep substantially zero potential across the serial combination of said capacitance and said variable voltage source, this condition being maintained for a predetermined time duration at least equal to the time of operation of said relay, whereafter said variable voltage source assumes such a potential that the voltage across said serial combination becomes sufficient to create a blocking potential across said asymmetrically conducting element.

9. Crosspoint operating circuit as claimed in claim 8, characterized in this, that said capacitance is branched between an input and an output terminal of an operational amplifier whose output constitutes said variable voltage source.

10. Crosspoint operating circuit as claimed in claim 8, characterized in this, that said potential is assumed by said variable voltage source.

11. Crosspoint operating circuit as claimed in claim 10, characterized in this, that said operational amplifier includes an output transformer.

12. Switching network including a plurality of crosspoint operating circuits as claimed in claim 7, characterized in this, that said capacitances are part of a path marking circuit which may be coupled to said elements.

13. Crosspoint operating circuit as claimed in claim 7, characterized in this, that it includes means to discharge said capacitance before a marking operation.

14. Crosspoint operating circuit as claimed in claim 9, characterized in this, that said voltage modification occurs by saturation of said operational amplifier.

15. Crosspoint operating circuit as claimed in claim 14, characterized in this, that a clamping diode is connected across said transformer.

16. A plurality of crosspoint operating circuits as claimed in claim 1, characterized in this, that the holding path of one crosspoint constitutes the operating path of the next.

17. Crosspoint operating circuits as claimed in claim 16, characterized in this, that the establishment of said holding path operates a trigger device causing said voltage modification.

18. Crosspoint operating circuit as claimed in claim 1, characterized in this, that said paths include a regulated current source.

References Cited

FOREIGN PATENTS 1,147,572 4/1969 Great Britain.

J D MILLER, Primary Examiner

W. J. SMITH, Assistant Examiner

U.S. Cl. X.R.

317—123